May 6, 1924.
H. L. FENNO
FASTENING DEVICE
Filed Nov. 14, 1922
1,492,596
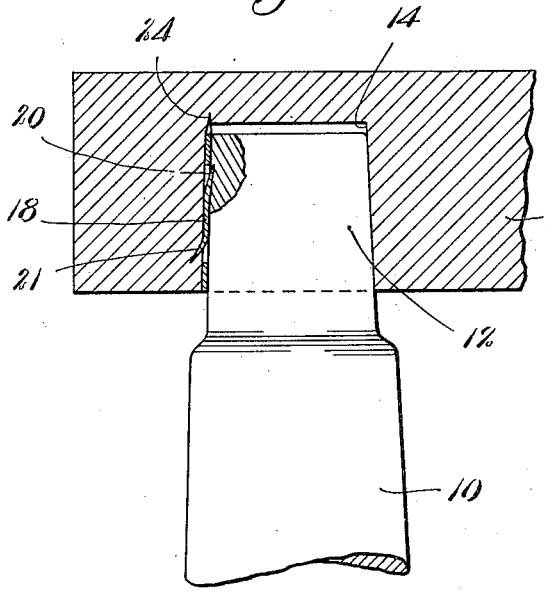
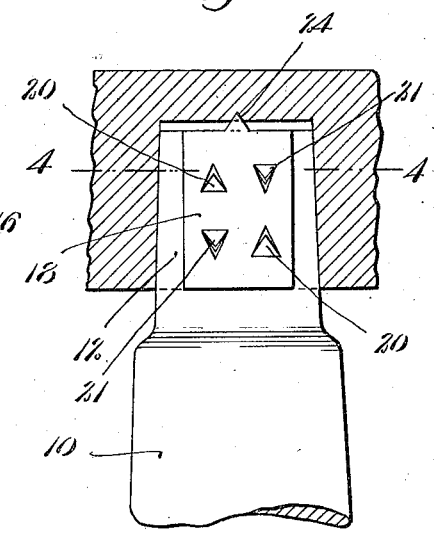
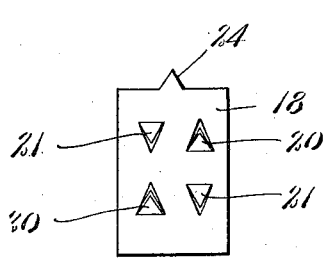
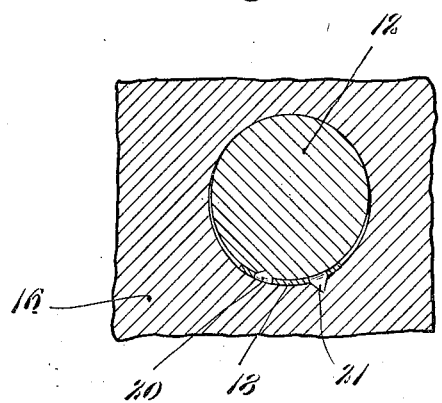
Inventor
Herbert L. Fenno
by Jas. H. Churchill
Atty.

Patented May 6, 1924.

1,492,596

UNITED STATES PATENT OFFICE.

HERBERT L. FENNO, OF CANTON, MASSACHUSETTS.

FASTENING DEVICE.

Application filed November 14, 1922. Serial No. 600,854.

*To all whom it may concern:*

Be it known that I, HERBERT L. FENNO, a citizen of the United States, residing in Canton, in the county of Norfolk and State of Massachusetts, have invented an Improvement in Fastening Devices, of which the following description, in connection with the accompanying drawings, is a specification, like characters on the drawings representing like parts.

This invention relates to a fastening device and more particularly to a fastening device for use in connection with the tenon and mortise joints of furniture and the like.

The object of the invention is to provide a fastening device for the purpose specified of novel and simple construction and which is adapted for securing the parts of a tenon and mortise joint together in a highly efficient and durable manner.

To this end the invention consists in the fastening device hereinafter described and particularly defined in the claim.

In the drawing illustrating the preferred embodiment of the invention, Fig. 1 is a vertical sectional view of a tenon and mortise joint whose members are secured together by a fastener embodying this invention; Fig. 2 is a similar view showing the fastening device in front elevation; Fig. 3 is a front elevation of the fastening device itself, and Fig. 4 is a horizontal section on line 4—4, of Fig. 2.

In general the present fastening device comprises a metal blank capable of being interposed between the tenon member and the mortise member of a tenon and mortise joint. The metal blank is provided with tangs, preferably one or more, projecting from opposite surfaces of the blank in such directions that the tang or tangs adjacent the tenon member extend toward the bottom of the mortise and the tang or tangs upon the opposite surface of the blank extend toward the mouth of the mortise, whereby forces tending to withdraw the tenon member from its mortise operate to increase the grip of the tangs upon both the tenon member and mortise member, thus insuring a permanently secure and tight joint.

Provision is also made for assisting in positioning the fastening device to the mortise member as will be described.

The tenon and mortise joints employed in the construction of different kinds of furniture and the like have heretofore comprised tenon members driven more or less tightly into corresponding mortises. In most instances glue or other adhesive is employed for fastening the parts of the joint. When such joints are subjected to the strains incident to the ordinary use of the furniture or other article embodying the joint, the adhesive bond soon becomes broken and in time the joint separates. Furthermore the adhesive joint is affected by lapse of time and atmospheric conditions, so that the joints at present employed are not as durable as they should be.

The present fastening device is adapted for use with all kinds of tenon and mortise joints and effectively serves to secure the parts together in a simple yet efficient and extremely durable manner.

Referring to the drawing, the fastening device is illustrated in the form preferably used in securing the leg to the seat of a chair, and in which the leg 10 of the chair has the usual member 12 adapted to be inserted into the usual mortise 14, in the under side of the seat 16 of the chair. The fastening device comprises a metal blank 18 preferably of thin sheet steel from which tangs 20, 21, are stamped. The tangs 20, 21, are substantially triangular in form and are stamped out of the metal blank with the sides and apices of the triangles free from the metal blank and the bases of the tangs attached to said blank, so that the tangs are provided with pointed free ends for readily penetrating into the wood. The tangs 20, 21, project from opposite surfaces of the blank and are arranged to have their free pointed ends extend in opposite directions to each other toward the opposed ends of the blank. In the illustrated form of fastening device, the two tangs are arranged on each surface as shown in Figs. 2 and 3, with the tangs 20 projecting upwardly and the tangs 21 projecting downward.

In use the metal blank is inserted into the mortise 14 and a centering point or tang 24 upon the end of the blank is driven into the bottom of the mortise. The centering or penetrating point 24 formed upon the end of the blank assists in positioning the device within the mortise, enabling the blank to be located and maintained in a position immediately adjacent the wall of the mortise independently of the operator. After the fastening device has been thus positioned within the mortise, the tenon member 12 is then driven therein, operating to force the outer tang or tangs into the material of the walls of the mortise. At the same time, because of the direction of extension of the inner tang or tangs, a minimum additional resistance is offered to the entrance of the tenon members. The inner tang or tangs are however caused to penetrate to some extent into the material of the tenon member in the manner illustrated in Fig. 1. Thereafter during the use of the furniture or other article, the forces tending to withdraw the tenon member from the mortise operate to cause both the inner and outer tangs to penetrate more firmly into the material of the tenon member and wall of the mortise respectively, thus increasing the effectiveness of the fastening device and strengthening the joint.

The arrangement in which adjacent tangs project from opposite surfaces of the blank when a plurality of tangs are used on each surface, insures a balance in the action of the fastening device rendering the joint more secure and durable.

The fastening device is particularly adapted for use in repairing furniture and the like, in which the mortises have become slightly enlarged or worn so that the tenon member fits into the mortise more or less loosely. In such instances, the metal blank of the fastening device serves as a reinforcement, stiffening the joint as well as securely fastening the parts thereof together.

While in the illustrated form the fastening device is shown as curved to conform to a rounded tenon, it may be formed in other shapes conforming to different shapes of tenon members.

Having thus described the invention, what is claimed is:

A fastening device of the character described, comprising a thin metal plate capable of insertion between one side of a tenon and its mortise and of a width less than the width of the mortise, and having tangs projecting from opposite surfaces of the plate and extending toward opposite ends thereof, and being also provided with a tang projecting from the mortise entering end thereof for penetrating the bottom of the mortise to hold the device in position against the wall of the mortise independently of the operator and before the tenon is driven therein.

In testimony whereof, I have signed my name to this specification.

HERBERT L. FENNO.